(No Model.)

A. E. STREADWICK.
MEANS FOR LUBRICATING VEHICLE SPINDLES.

No. 582,323. Patented May 11, 1897.

WITNESSES

INVENTOR
Aubrey E. Streadwick.
BY
Edgar Tate & Co.
ATTORNEYS

UNITED STATES PATENT OFFICE.

AUBREY EDWARD STREADWICK, OF KINGSTON, JAMAICA.

MEANS FOR LUBRICATING VEHICLE-SPINDLES.

SPECIFICATION forming part of Letters Patent No. 582,323, dated May 11, 1897.

Application filed September 19, 1896. Serial No. 606,436. (No model.)

*To all whom it may concern:*

Be it known that I, AUBREY EDWARD STREADWICK, a subject of the Queen of England, and a resident of Kingston, Jamaica, have invented certain new and useful Improvements in Means for Lubricating Vehicle-Spindles, of which the following is a specification, reference being had to the accompanying drawings, forming a part thereof, in which similar numerals of reference indicate corresponding parts.

This invention relates to means for lubricating the spindles of the axles of wagons, trucks, and other vehicles; and the object thereof is to provide spindles of this class which are so constructed as to be self-lubricating and also to provide an improved form of nut-lock for the spindle-nut.

The invention is fully disclosed in the following specification, of which the accompanying drawings form a part, in which—

Figure 1:
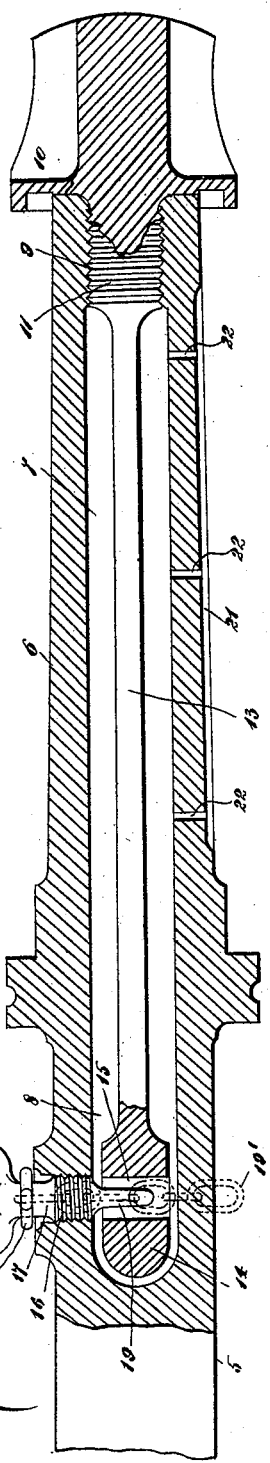
Figure 2:
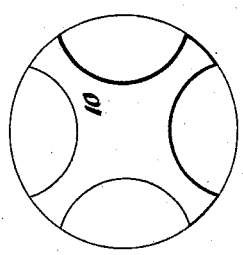

Figure 1 is a central longitudinal section of a vehicle-spindle constructed according to my invention and provided with the attachments which I employ, part of which are also shown in section; and Fig. 2, an end view of the spindle-nut.

In the drawings forming part of this specification I have shown at 5 one end of the axle of a vehicle which is provided with a spindle 6, in which is formed a central longitudinal bore 7, which extends a short distance into the axle, as shown at 8, and said bore opens at the outer end of a spindle, and the inner walls thereof are screw-threaded, as shown at 9. I also provide a spindle-nut 10 of any desired form, and this nut is provided with a screw-threaded extension 11, which is adapted to be screwed into the end of the bore 7, formed in the spindle 6, and said screw-threaded extension 11 of the nut 10 is provided with a shaft 13, which when the nut is screwed into place extends inwardly to the inner end of the bore 7 and is provided with an enlarged head 14, having a vertical transverse bore or passage 15, and the axle 5 is provided above the inner end of the central bore 7 with a transverse screw-threaded bore or passage 16, and I also provide a screw-threaded key-plug 17, having a head 18 and a reduced extension 19, which is adapted to enter the transverse bore or passage 15 in the head 14 of the shaft 16. I also provide a chain, which is shown in dotted lines at 19', and which is adapted to be passed around the axle 5, and is provided with a ring 20, through which the screw-threaded key-plug 16 is adapted to be passed, and said ring is secured to said key-plug in any desired manner, and the object of said chain and said ring is to prevent the turning of said key-plug after it has been screwed into position.

The spindle 6 is provided on its under side with a longitudinal groove 21, and formed in the lower side of said spindle are a plurality of vertical passages or openings 22, by means of which said groove and the central bore 7 of the spindle are placed in communication, and the operation will be readily understood from the foregoing description when taken in connection with the accompanying drawings and the following statement thereof. The wheel is first placed in position on the spindle and the spindle-nut is then screwed into position, the screw-threaded extension 11 entering the screw-threaded end of the bore 7, and the key-plug 17 is then screwed into position, after which it will be impossible to remove either the wheel or the nut from the spindle without first removing said key-plug, and whenever it is desired to lubricate the spindle the key-plug is removed and the lubricating material is poured through the vertical passage or opening 16 into the central bore 7 of the spindle, and said lubricating material, passes through the openings or passages 22 into the groove 21 and into the hub of the wheel, as will be readily understood.

The nut 10 is of the form shown in Figs. 1 and 2, and said nut, together with the shaft 13, may be connected with the spindle or detached therefrom by hand, or a wrench may be employed, and the chain 19' prevents the accidental removal of the key-plug, and the said key-plug prevents the loss or removal of the spindle-nut, and it will thus be seen that in addition to providing means for lubricating the spindle I also provide a nut-lock whereby the spindle-nut is held in place and the accidental removal or loss thereof is prevented.

Having fully described my invention, I claim as new and desire to secure by Letters Patent—

1. The combination with the axle and spindle of a vehicle, said spindle being provided with a central longitudinal bore which extends into the axle and the outer end of which is screw-threaded, of a spindle-nut provided with a screw-threaded extension which is adapted to enter the screw-threaded end of the bore and with a shaft which projects through said bore into the axle, said axle being also provided with a vertical screw-threaded passage formed therein, over the inner end of said bore, and a key-plug which is adapted to be inserted into said vertical passage, and into a transverse passage formed in the inner end of said shaft, substantially as shown and described.

2. The combination with the axle and spindle of a vehicle, said spindle being provided with a central longitudinal bore which extends into the axle, and the outer end of which is screw-threaded, of a spindle-nut provided with a screw-threaded extension which is adapted to enter the screw-threaded end of the bore and with a shaft which projects through said bore into the axle, said axle being also provided with a vertical screw-threaded passage formed therein, over the inner end of said bore, and a key-plug which is adapted to be inserted into said vertical passage, and into a transverse passage formed in the inner end of said shaft, said spindle being also provided with ports or passages formed therein, which communicate with said bore, substantially as shown and described.

3. The combination with the axle and spindle of a vehicle, said spindle being provided with a central longitudinal bore which extends into the axle, and the outer end of which is screw-threaded, of a spindle-nut provided with a screw-threaded extension which is adapted to enter the screw-threaded end of the bore, and with a shaft which projects through said bore into the axle, said axle being also provided with a vertical screw-threaded passage formed therein, over the inner end of said bore, and a key-plug which is adapted to be inserted into said vertical passage, and into a transverse passage formed in the inner end of said shaft, said spindle being also provided with ports or passages formed therein, which communicate with said bore, and said key-plug being screw-threaded, and provided with a chain which passes around said axle, and with a ring through which the key-plug is passed, substantially as shown and described.

In testimony that I claim the foregoing as my invention I have signed my name, in presence of the subscribing witnesses, this 29th day of August, 1896.

AUBREY EDWARD STREADWICK.

Witnesses:
PHILIP NERIE CONROSO,
ARNOLD EDWARD THOMPSON.